United States Patent
Francois et al.

(10) Patent No.: US 9,229,716 B2
(45) Date of Patent: Jan. 5, 2016

(54) TIME-BASED TASK PRIORITY BOOST MANAGEMENT USING BOOST REGISTER VALUES

(75) Inventors: Christopher Francois, Shakopee, MN (US); Giles R. Frazier, Austin, TX (US); Bruce G. Mealey, Austin, TX (US); Suresh E. Warrier, Austin, TX (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 997 days.

(21) Appl. No.: 13/323,268

(22) Filed: Dec. 12, 2011

(65) Prior Publication Data

US 2013/0152098 A1  Jun. 13, 2013

(51) Int. Cl.
*G06F 9/30* (2006.01)
*G06F 9/48* (2006.01)
*G06F 9/46* (2006.01)

(52) U.S. Cl.
CPC .......... *G06F 9/3009* (2013.01); *G06F 9/4881* (2013.01); *G06F 2209/486* (2013.01)

(58) Field of Classification Search
None
See application file for complete search history.

(56) References Cited

U.S. PATENT DOCUMENTS

| | | | |
|---|---|---|---|
| 6,510,437 B1 | 1/2003 | Bak et al. | |
| 7,055,070 B1 * | 5/2006 | Uhler et al. | 714/45 |
| 7,278,141 B2 | 10/2007 | Accapadi et al. | |
| 7,380,247 B2 * | 5/2008 | Accapadi et al. | 718/103 |
| 7,458,076 B2 | 11/2008 | Swanberg et al. | |
| 7,496,928 B2 * | 2/2009 | Fuller | 719/319 |
| 7,734,879 B2 | 6/2010 | McKenney et al. | |
| 7,752,621 B2 | 7/2010 | Kush | |
| 2005/0050550 A1 * | 3/2005 | Fuller | 719/319 |
| 2008/0005740 A1 | 1/2008 | Terrell | |

* cited by examiner

*Primary Examiner* — Eric C Wai
(74) *Attorney, Agent, or Firm* — James L. Baudino (57) ABSTRACT

According to one aspect of the present disclosure, a method and technique for task priority boost management is disclosed. The method includes: responsive to a thread executing in user mode an instruction to boost a priority of the thread, accessing a boost register, the boost register accessible in kernel mode; determining a value of the boost register; and responsive to determining that the boost register holds a non-zero value, boosting the priority of the thread.

25 Claims, 4 Drawing Sheets

TIME-BASED TASK PRIORITY BOOST MANAGEMENT USING BOOST REGISTER VALUES

BACKGROUND

In a multi-processor environment, multiple processes or threads of an application program may request access to common information or data. The independence of the executing threads may lead to simultaneous operations being performed on certain data, which may lead to incorrect results. To prevent the foregoing, a thread may acquire a lock to prevent another thread from accessing or using the same resource at the same time. For example, during execution of a critical section of code in the process, a lock may be acquired by a thread to prevent the thread from sharing a particular resource until the lock is released.

Operating systems generally control access to a processor of the multi-processor environment. In some environments, priorities may be assigned to different processes or threads based in the relative importance or urgency of the functions performed by the thread. In some application programs, the thread may request a priority boost, such as before entering a critical section of code. The boosted priority may enable the thread to preempt other threads and access a shared resource controlled by a lock. When the thread is finished executing the critical section of code, the lock is released and the priority of the thread is unboosted (e.g., returning to a normal priority state).

BRIEF SUMMARY

According to one aspect of the present disclosure a method and technique for task priority boost management is disclosed. The method includes: responsive to a thread executing in user mode an instruction to boost a priority of the thread, accessing a boost register, the boost register accessible in kernel mode; determining a value of the boost register; and responsive to determining that the boost register holds a non-zero value, boosting the priority of the thread.

BRIEF DESCRIPTION OF THE SEVERAL VIEWS OF THE DRAWINGS

For a more complete understanding of the present application, the objects and advantages thereof, reference is now made to the following descriptions taken in conjunction with the accompanying drawings, in which.

DETAILED DESCRIPTION

Embodiments of the present disclosure provide a method, system and computer program product for task priority boost management. For example, in some embodiments, the method and technique includes: responsive to a thread executing in user mode an instruction to boost a priority of the thread, accessing a boost register, the boost register accessible in kernel mode; determining a value of the boost register; and responsive to determining that the boost register holds a non-zero value, boosting the priority of the thread. Thus, in some embodiments of the present disclosure, user mode application program priority boosts are controlled and/or managed by regulating a time that a thread may remain (or even initiate) a priority boosted state. For example, embodiments of the present disclosure enable priority boosting of a thread based on a value residing in a kernel-accessible register. The value in the register may be decremented over a period of time to control the time a thread is executing in the priority boosted state such that when the value decrements to a certain value (e.g., zero), the thread is automatically unboosted.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer usable or computer readable medium(s) may be utilized. The computer readable medium may be a computer readable signal medium or a computer readable storage medium. A computer readable storage medium may be, for example but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
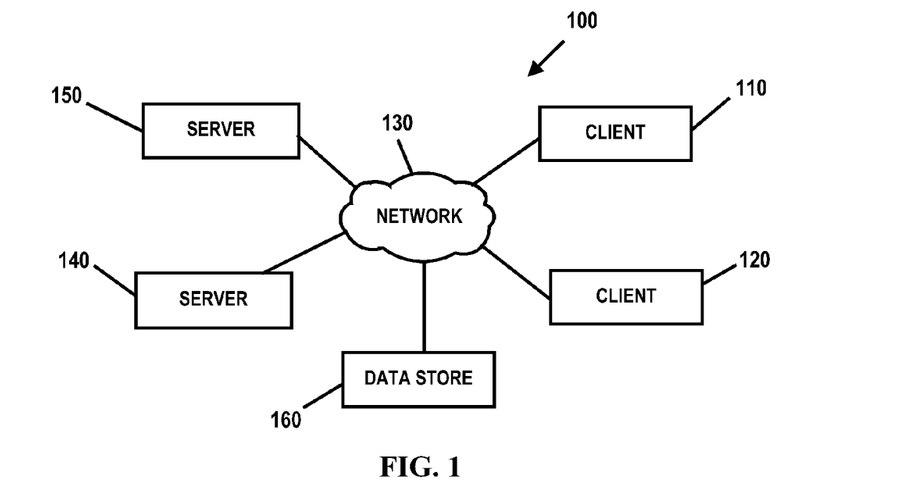
FIG. 1 is an embodiment of a network of data processing systems in which the illustrative embodiments of the present disclosure may be implemented.
Figure 2:
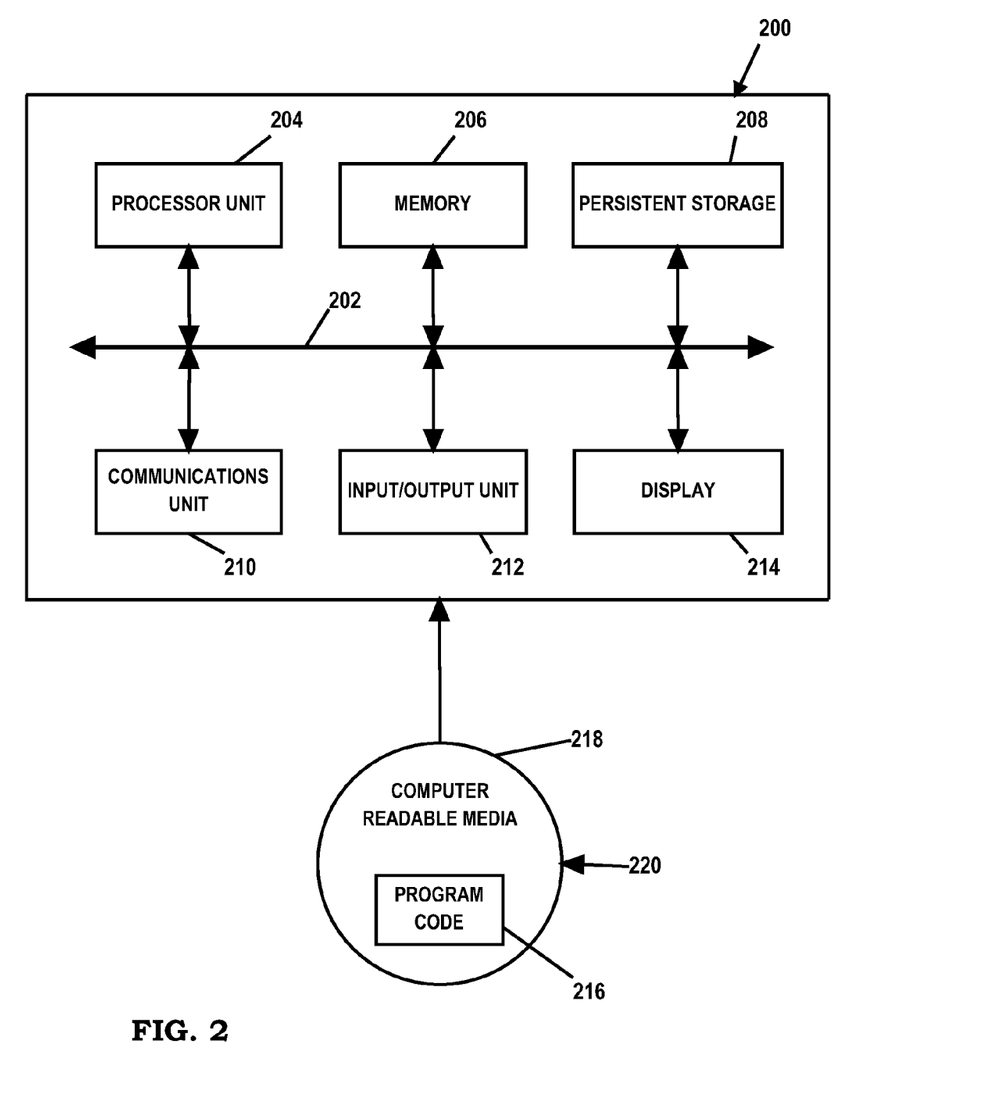
FIG. 2 is an embodiment of a data processing system in which the illustrative embodiments of the present disclosure may be implemented.

With reference now to the Figures and in particular with reference to FIGS. 1-2, exemplary diagrams of data processing environments are provided in which illustrative embodiments of the present disclosure may be implemented. It should be appreciated that FIGS. 1-2 are only exemplary and are not intended to assert or imply any limitation with regard to the environments in which different embodiments may be implemented. Many modifications to the depicted environments may be made.

FIG. 1 is a pictorial representation of a network of data processing systems in which illustrative embodiments of the present disclosure may be implemented. Network data processing system 100 is a network of computers in which the illustrative embodiments of the present disclosure may be implemented. Network data processing system 100 contains network 130, which is the medium used to provide communications links between various devices and computers connected together within network data processing system 100. Network 130 may include connections, such as wire, wireless communication links, or fiber optic cables.

In some embodiments, server 140 and server 150 connect to network 130 along with data store 160. Server 140 and server 150 may be, for example, IBM System p® servers. In addition, clients 110 and 120 connect to network 130. Clients 110 and 120 may be, for example, personal computers or network computers. In the depicted example, server 140 provides data and/or services such as, but not limited to, data files, operating system images, and applications to clients 110 and 120. Network data processing system 100 may include additional servers, clients, and other devices.

In the depicted example, network data processing system 100 is the Internet with network 130 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

FIG. 2 is an embodiment of a data processing system 200 such as, but not limited to, client 110 and/or server 140 in which an embodiment of a task priority boost management system according to the present disclosure may be implemented. In this embodiment, data processing system 200 includes a bus or communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

In some embodiments, memory 206 may be a random access memory or any other suitable volatile or non-volatile storage device. Persistent storage 208 may take various forms depending on the particular implementation. For example, persistent storage 208 may contain one or more components or devices. Persistent storage 208 may be a hard drive, a flash memory, a rewritable optical disk, a rewritable magnetic tape, or some combination of the above. The media used by persistent storage 208 also may be removable such as, but not limited to, a removable hard drive.

Communications unit 210 provides for communications with other data processing systems or devices. In these examples, communications unit 210 is a network interface card. Modems, cable modem and Ethernet cards are just a few of the currently available types of network interface adapters. Communications unit 210 may provide communications through the use of either or both physical and wireless communications links.

Input/output unit 212 enables input and output of data with other devices that may be connected to data processing system 200. In some embodiments, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer readable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. For example, a storage device in data processing system 200 is any hardware apparatus that may store data. Memory 206, persistent storage 208, and computer readable media 218 are examples of storage devices in a tangible form.

Figure 3:
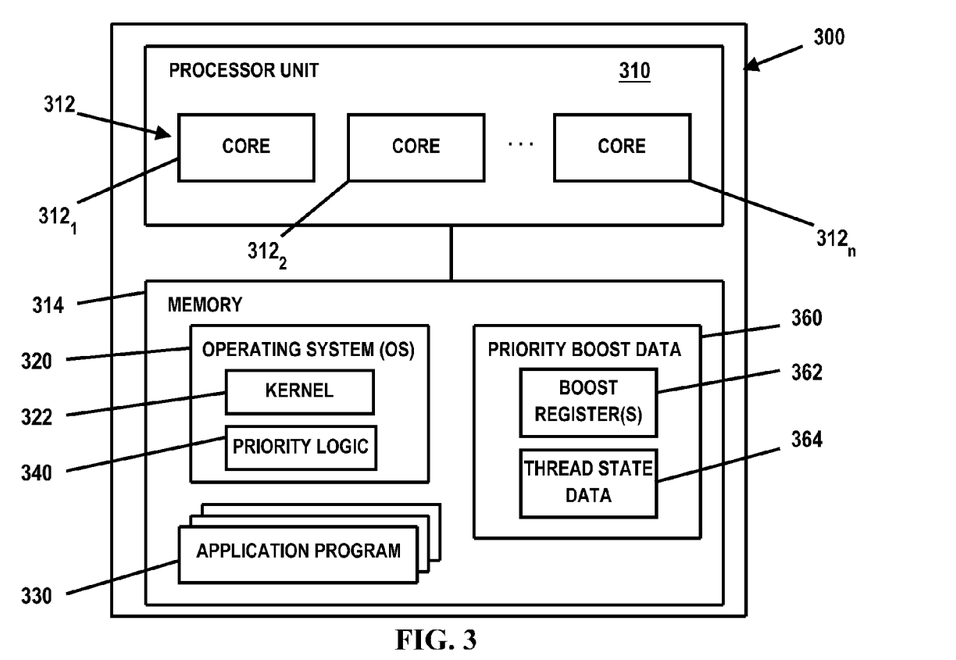
FIG. 3 is a diagram illustrating an embodiment of a data processing system for task priority boosting management in which illustrative embodiments of the present disclosure may be implemented.

FIG. 3 is an illustrative embodiment of a system 300 for task priority boost management. System 300 may be implemented on data processing systems or platforms such as, but not limited to, servers 140 and/or 150, clients 110 and/or 120, or at other data processing system locations. In the embodiment illustrated in FIG. 3, system 300 comprises a processor unit 310 coupled to a system memory 314. Memory 314 includes an operating system (OS) 320 with kernel 322 and one or more application programs 330. Processor unit 310 may comprise a multi-processor unit having multiple processors where each processor may include multiple cores 312 (e.g., $312_1$-$312_n$). Processor unit 310 enables the execution of multiple processes within one or more application programs (e.g., application programs 330). Multiple threads can exist within a particular process (e.g., threads may be generated by processes and/or independently running programs). The resources of a process may include a shared library, processor registers, address space, etc. Kernel 322 may control access to processor unit 310 by scheduling threads for execution and/or otherwise making resources available to threads. OS 320 enables operating the machine hosting kernel 322 in supervisor or kernel mode where kernel 322 has control of the hardware resources of system 300 and provides abstractions for the processes (e.g., threads of application programs 330) running or executing in user mode.

In a multi-processor environment, multiple processes or threads of an application program may request access to common information that memory 314 or another memory storage area may maintain or may request/use one or more other resources that can be used by another process. A thread may acquire a lock to prevent another thread from accessing or using the same resource at the same time. For example, during execution of a critical section of code in the process, a lock may be acquired by a thread to prevent other threads from accessing the resource.

In the embodiment illustrated in FIG. 3, OS 320 includes priority logic 340 for managing task priority boosts of threads. Logic 340 may be hardware-based, software-based, or some combination of both. For example, logic 340 may comprise software, logic and/or executable code for performing various functions as described herein (e.g., residing as software and/or an algorithm running on a processor unit, hardware logic residing in a processor or other type of logic chip, centralized in a single integrated circuit or distributed among different chips in a data processing system). In some embodiments, the present disclosure provides a hardware mechanism to enable OS 320 to control via kernel mode the time period a task or thread can remain priority boosted. For example, in the embodiment illustrated in FIG. 3, system 300 includes priority boost data 360 including boost register(s) 362 and task thread state data 364. Boost register(s) 362 and/or thread state data 364 may reside in memory 314, a register space of processor unit 310, or elsewhere. In some embodiments, boost register(s) 362 and thread state data 364 are implemented by hardware to be accessible only in kernel mode by OS 320, thereby preventing modification of their contents by an application executing in user mode. Boost registers 362 may be allocated for each processor core 312 to thereby control the time a thread executing via a respective processor core 312 may remain in a priority boosted state.

According to the present disclosure, a value is written to and/or stored in boost register 362 to indicate a time a thread may remain in a priority boosted state. For example, in some embodiments, in response to the initiation and/or execution of a thread, logic 340 may write in kernel mode a predefined value to boost register 362 corresponding to the processor core 312 executing the thread. In response to the thread executing an instruction to boost its priority, logic 340 accesses boost register 362 to determine whether a non-zero value resides in boost register 362. For example, in some embodiments, the value written to boost register 362 represents a quantity of machine or processor cycles a thread may remain in a priority boosted state. In some embodiments, the value in boost register 362 is decremented by one with each processor cycle. Thus, for example, if a non-zero value resides in boost register 362 when the thread executes an instruction to boost its priority, priority boosting for the thread is enabled. The thread may remain in the boosted priority state while the value in boost register 362 remains non-zero (decrementing by one with each processor cycle while the thread remains in the boosted priority state). If the thread is executing in the priority boosted state when the value in boost register 362 reaches zero, logic 340 unboosts the priority of the thread. Thus, instead of an operation involving a system call to boost priority, embodiments of the present disclosure define a machine instruction that enables boosting. For example, an application may include an instruction around a critical code section for boosting its priority. In some embodiments, this instruction is defined as a no operation (NOP) instruction (e.g., an instruction that essentially is not executed by the hardware or execution can be considered to take almost zero machine cycles). In this embodiment, the NOP instruction causes hardware to check if boost register 362 is zero (e.g., by an internal state flag or otherwise). If boost register 362 is zero (or the state flag is not set), zero, or nearly zero, machine cycles are spent. Thus, embodiments of the present disclosure enable a change in the ratio of instructions executed such that the boosted hardware thread executes at a higher percentage. For example, on a 4-threaded core, usually, each thread receives 25% of core resources on an average. The boosted priority may enable one of the threads to acquire 50% (or more) while the remaining three threads share the remaining 50% (or the remaining percentage). Thus, with boosted priority, the boosted thread runs faster while holding a critical resource, thereby increasing system performance. The boosted priority is a user-mode lock (i.e., protecting user-mode (or application-level) resources) and runs in user mode. It should be understood that there may be multiple boosted priority levels, and different levels may include different rates of decrementing the value in boost register 362.

In some embodiments, if the thread executes an instruction unboosting its priority, logic 340 determines a value currently residing in boost register 362 and writes/stores the current value as thread state data 364 for the executing thread (which may also include the boost priority level if multiple boost priority levels are used). For example, if the thread unboosts it priority before the value in boost register 362 decrements to zero, the remaining processor cycles that the thread may have allocated to a boosted priority is saved on a context switch as thread state data 364. In response to the thread executing another instruction to boost its priority, thread state data 364 (e.g., the remaining processor cycles that the thread may allocate to a boosted priority) is dispatched to boost register 362. As indicated above, while the thread is executing in a boosted priority, the value in boost register 362 is decremented with each processor cycle.

In some embodiments, logic 340 may write a particular value to boost register 362 such that the value of boost register 362 is not decremented while the thread is executing in a priority boosted state. For example, in some embodiments, a particular value may be assigned and/or designated as a non-decrementing value (e.g., a maximum value possible to be set for boost register 362 or some other predefined value) such that when logic 340 accesses boost register 362 in response to the thread executing a priority boosting instruction, the designated value indicates to logic 362 that the designated value is to remain undecremented, thereby enabling the thread to remain executing in a boosted priority state (e.g., until thread unboosts it priority or the thread completes).

Logic 340 may also be configured to periodically evaluate an executing thread and determine whether to modify a value residing in boost register 362. For example, some threads may execute for an extended period of time. In some embodiments, logic 340 may evaluate the value residing in boost register 362 (or as thread state data 364) and add to its value based on a predefined policy (e.g., adding one millisecond for every one hundred milliseconds of run time the thread has executed).

In some embodiments, the instruction that a thread uses/executes to boost or unboost its priority may comprise a variation of a no-op instruction. For example, a typical no-op instruction may include "OR X,X,X" or "AND X,X,X" where "X" is meant to indicate "register X." In some embodiments, the value of "X" can be used to indicate a requested boost priority. For example, values of "X" from 0 to 2 could be defined as low-priority, a value of 3 could be defined as normal priority, and values greater than 3 could be defined as high-priority. If a thread executes the "OR X.X.X" instruction with values of "X" greater than 3 when boost register 362 is zero, the priority of the thread remains unchanged. In this case, the instruction is treated as a no-op instruction and completes with minimal or possible zero processor cycles. When the thread is eligible for boosted priority (e.g., a non-zero value resides in boost register 362) and the thread executes the instruction with "X" greater than 3, the thread's priority is corresponding boosted. If the value in boost register 362 decrements to zero before the thread unboosts its priority to 3 or less, the priority of the thread automatically reverts to priority 3 (i.e., normal priority). This, in this example, monitoring by the thread of how much boost capacity remains is unneeded—the thread may execute the boost priority no-op instruction with negligible performance impact.

In some embodiments, kernel 322 may be configured to manage thread boosting. For example, in some embodiments, a system call may be made to enter kernel 322 for a thread to be boosted or unboosted. In this embodiment, kernel 322 may decrement a runtime when a thread is undispatched (e.g., preempted or went to sleep) or kernel 322 may set a timer to actuate based on the "boost time" left for a thread.

Figure 4:
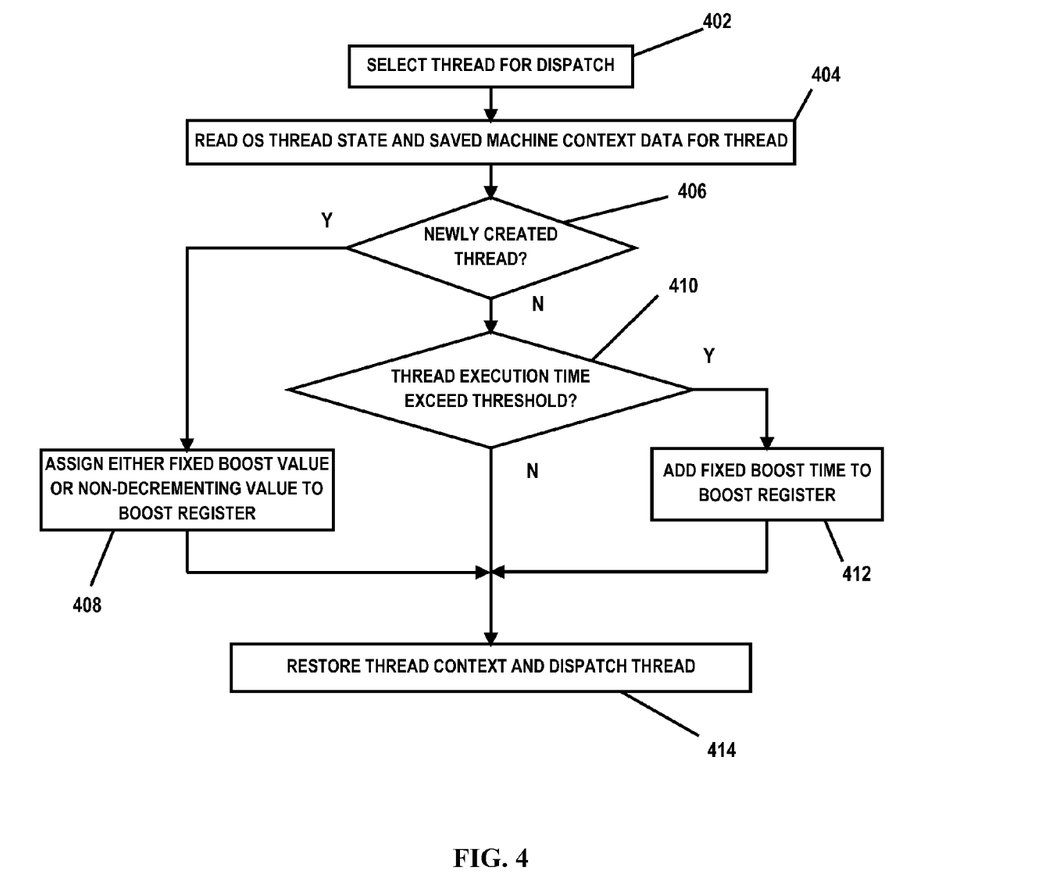
FIG. 4 is a flow diagram illustrating an embodiment of a method for task priority boosting management.

FIG. 4 is a flow diagram illustrating an embodiment of a method for task priority boost management. In FIG. 4, OS 320 is performing various functions/operations related to the dispatching of a thread. The method begins at block 402, where OS 320 selects a thread to be dispatched. At block 404, the OS thread state and saved machine context data is read for the selected thread. For example, stack pointers, register information, address contexts, and other information is read for the selected thread. At decisional block 406, a determination is made whether the selected thread is a newly created thread. If so, the method proceeds to block 408, where either a fixed/predefined value or a non-decrementing value is assigned and/or stored in boost register 362. The method then proceeds to block 414. If at block 406 it is determined that the selected thread is not a newly selected thread, the method proceeds to decisional block 410, where a determination is made whether the time the thread has been executing has exceeded a particular threshold. For example, some threads may execute for an extended period of time. If the thread has been executing for a period of time exceeding a particular threshold, the method proceeds to block 412, where the value in boost register 362 may be increased (e.g., adding one millisecond for every one hundred milliseconds of run time the thread has been executing). If at decisional block 410 it is determined that the selected thread has not been executing for a period of time exceeding a particular threshold, the method proceeds to block 414.

At block 414, the thread's context is restored and the thread is dispatched. Restoring the thread context restores the current mode (user or kernel) of execution for the thread, its boost register as well its priority state (boosted or unboosted) because these are saved as part of the thread context. Thus, the thread will run with boosted priority (if the boost register has a non-zero value and the priority state indicates that it is boosted) after dispatch without any explicit kernel actions.

Figure 5:
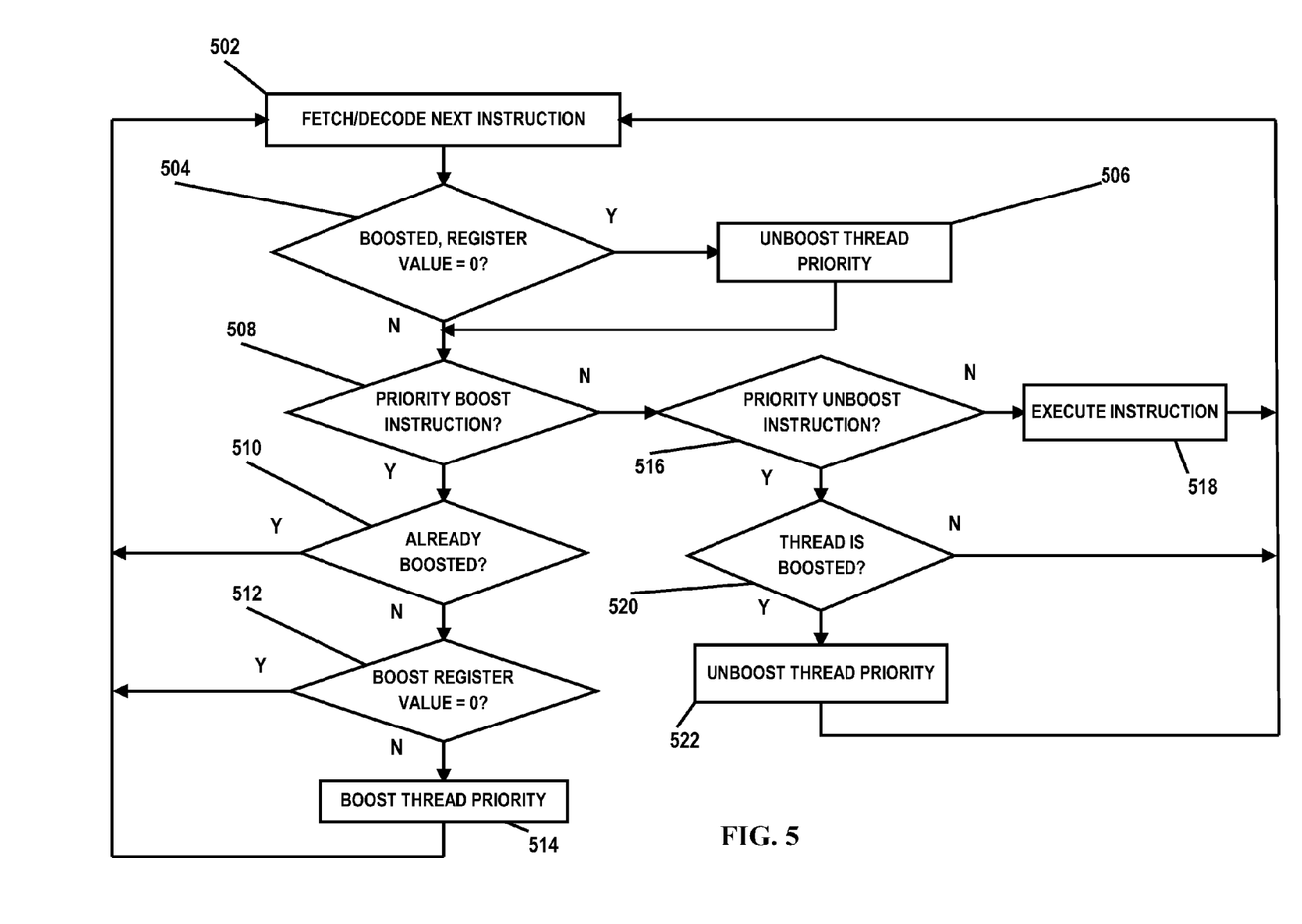
FIG. 5 is a flow diagram illustrating another embodiment of a method for task priority boosting management.

FIG. 5 is a flow diagram illustrating another embodiment of a method for task priority boost management. In FIG. 5, the flow diagram illustrates instruction execution of a thread in hardware. As discussed above, in some embodiments, during thread execution, the value in boost register 362 is being decremented (e.g., decremented one count for every machine cycle) if the thread is boosted and the machine is in user mode as identified by machine state registers that are part of the machine context of the thread. In some embodiments, time spent in the fetch/decode and check for priority boost/unboost stages may be included in the machine cycles consumed by the thread. If, however, the value in boost register is a non-decrementing value, then the value in boost register 362 would not be decremented while the thread is boosted. It should also be understood that in some embodiments, depending on the machine configuration, priority boost and unboost instructions may be NOP instructions that would be ignored or discarded and a next instruction would be fetched/decoded.

Referring to FIG. 5, the method begins at block 502, where a next instruction of a thread running inn user mode is fetched/decoded. The method then proceeds to decisional block 504, where a determination is made whether the thread is boosted and whether the value in boost register is equal to zero. If so, the method proceeds to block 506, where the boost priority of the thread is unboosted. If at block 504 a determination is made that the thread is not boosted and the value in boost register 362 is not equal to zero, the method proceeds to decisional block 508.

At decisional block 508, a determination is made whether the fetched instruction is a priority boost instruction. If so, the method proceeds to decisional block 510, where a determination is made whether the threads is already priority boosted. If so, the method proceeds to block 502 to fetch/decode the next instruction. If the thread is not already boosted, the method proceeds from decisional block 510 to decisional block 512, where a determination is made whether the value in boost register 362 is equal to zero. If so, the method proceeds to block 502 to fetch/decode the next instruction. If the value in boost register 362 is not equal to zero, the method proceeds from decisional block 512 to block 514, where the thread priority is boosted. The method then proceeds to block 502 to fetch/decode the next instruction.

If at decisional block 508 a determination is made that the instruction is not a priority boost instruction, the method proceeds to decisional block 516, where a determination is made whether the fetched instruction is a priority unboost instruction. If not, the method proceeds to block 518, where the instruction is executed. If the instruction is a priority unboost instruction, the method proceeds from decisional block 516 to decisional block 520, where a determination is made whether the thread priority is boosted. If not, proceeds to block 502 to fetch/decode the next instruction. If the thread priority is boosted, the method proceeds from decisional block 520 to block 522, where the thread priority is unboosted.

Thus, embodiments of the present disclosure enable control and management over user mode application program boosts by regulating a time that a thread may remain (or even initiate) a priority boosted state. For example, embodiments of the present disclosure enable priority boosting of a thread based on a value residing in a kernel-accessible register. The value in the register may be decremented over a period of time to control the time a thread is executing in the priority boosted state such that when the value decrements to a certain value (e.g., zero), the thread is automatically unboosted. Thus, embodiments of the present disclosure provide a hardware mechanism that enables the OS to control how long a task can stay boosted without requiring system calls. Also, because the register value is controlled by the OS in kernel mode, the application programs are unable to stay boosted unless continuous boosting has been enabled by the OS (e.g., by writing a certain or predefined vale to the boost register 362).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method for task priority boost management, comprising:
responsive to a thread executing in user mode an instruction to boost a priority of the thread, accessing a boost register, the boost register accessible only by a kernel of an operating system in kernel mode;
determining a value of the boost register, the value indicating a time period that the thread may execute in a boosted priority state; and
responsive to determining that the boost register holds a non-zero value, boosting the priority of the thread.

2. The method of claim 1, further comprising enabling, by an operating system, priority boosting of the thread by loading in kernel mode a non-zero value in the boost register.

3. The method of claim 1, further comprising decrementing the value of the boost register each processor cycle while the thread is executing in boosted priority.

4. The method of claim 3, further comprising, responsive to the value of the boost register reaching zero, unboosting the priority of the thread.

5. The method of claim 3, further comprising, responsive to determining that the non-zero value of the boost register matches a predefined value set by an operating system to maintain a boosted priority of a thread, maintaining the non-zero value in an undecremented state.

6. The method of claim 1, further comprising, responsive to the thread executing in user mode an instruction to unboost the priority of the thread, saving a current value of the boost register as thread state data.

7. The method of claim 6, further comprising, responsive to the thread executing in user mode another instruction to boost a priority of the thread, restoring the thread state data value to the boost register.

8. The method of claim 1, further comprising:
analyzing, by an operating system, a run time of the thread in boosted priority; and
based on the run time, modifying in kernel mode a value in the boost register.

9. A system for task priority boost management, comprising:
a processor;
an operating system controlling access by an executing thread to the processor, the operating system comprising priority logic for controlling a priority boost of the thread, the priority logic configured to:
responsive to the thread executing in user mode an instruction to boost a priority of the thread, access a boost register, the boost register accessible only by a kernel of the operating system in kernel mode;
determine a value of the boost register, the value indicating a time period that the thread may execute in a boosted priority state; and
responsive to determining that the boost register holds a non-zero value, boost the priority of the thread.

10. The system of claim 9, wherein the priority logic is configured to enable priority boosting of the thread by loading in kernel mode a non-zero value in the boost register.

11. The system of claim 9, wherein the priority logic is configured to decrement the value of the boost register each processor cycle while the thread is executing in boosted priority.

12. The system of claim 11, wherein the priority logic is configured to, responsive to the value of the boost register reaching zero, unboosting the priority of the thread.

13. The system of claim 11, wherein the priority logic is configured to, responsive to determining that the non-zero value of the boost register matches a predefined value set to maintain a boosted priority of a thread, maintain the non-zero value in an undecremented state.

14. The system of claim 9, wherein the priority logic is configured to, responsive to the thread executing in user mode an instruction to unboost the priority of the thread, save a current value of the boost register as thread state data.

15. The system of claim 14, wherein the priority logic is configured to, responsive to the thread executing in user mode another instruction to boost a priority of the thread, restore the thread state data value to the boost register.

16. The system of claim 9, wherein the priority logic is configured to:
analyze a run time of the thread in boosted priority; and
based on the run time, modify in kernel mode a value in the boost register.

17. A computer program product for task priority boost management, the computer program product comprising:
a non-transitory computer readable medium having computer readable program code embodied therewith, the computer readable program code comprising computer readable program code configured to:
responsive to a thread executing in user mode an instruction to boost a priority of the thread, access a boost register, the boost register accessible only by a kernel of an operating system in kernel mode;
determine a value of the boost register, the value indicating a time period that the thread may execute in a boosted priority state; and
responsive to determining that the boost register holds a non-zero value, boost the priority of the thread.

18. The computer program product of claim 17, wherein the computer readable program code is configured to enable priority boosting of the thread by loading in kernel mode a non-zero value in the boost register.

19. The computer program product of claim 17, wherein the computer readable program code is configured to decrement the value of the boost register each processor cycle while the thread is executing in boosted priority.

20. The computer program product of claim 17, wherein the computer readable program code is configured to, responsive to the thread executing in user mode an instruction to unboost the priority of the thread, save a current value of the boost register as thread state data.

21. The computer program product of claim 20, wherein the computer readable program code is configured to, responsive to the thread executing in user mode another instruction to boost a priority of the thread, restore the thread state data value to the boost register.

22. A method for task priority boost management, comprising:
responsive to a thread initiating execution, loading in kernel mode a timing value in a boost register, the boost register accessibly only by a kernel of an operating system;
responsive to the thread executing in user mode an instruction to boost a priority of the thread, accessing the boost register in kernel mode;
determining a value of the boost register;
responsive to determining that the boost register holds a timing value enabling priority boosting, boosting the priority of the thread; and
decrementing a value in the boost register each processor cycle while the thread is executing in boosted priority.

23. The method of claim 22, further comprising, responsive to the thread executing in user mode an instruction to unboost the priority of the thread, saving a current value of the boost register as thread state data.

24. The method of claim 23, further comprising, responsive to the thread executing in user mode another instruction to boost a priority of the thread, restoring the thread state data value to the boost register.

25. The method of claim 22, further comprising:
analyzing a run time of the thread in boosted priority; and
based on the run time, increasing in kernel mode a value in the boost register.

* * * * *